US008830291B2

(12) United States Patent
Kay et al.

(10) Patent No.: US 8,830,291 B2
(45) Date of Patent: Sep. 9, 2014

(54) SYSTEM AND METHOD FOR PROVIDING CUSTOMER SUPPORT ON A USER INTERFACE

(75) Inventors: Christopher E. Kay, Palo Alto, CA (US); Sam Lising, San Francisco, CA (US); Tim Kobe, Honolulu, HI (US)

(73) Assignee: Citibank, N.A., New York, NY (US)

( * ) Notice: Subject to any disclaimer, the term of this patent is extended or adjusted under 35 U.S.C. 154(b) by 235 days.

(21) Appl. No.: 13/082,612

(22) Filed: Apr. 8, 2011

(65) Prior Publication Data

US 2011/0249081 A1 Oct. 13, 2011

Related U.S. Application Data

(60) Provisional application No. 61/322,363, filed on Apr. 9, 2010.

(51) Int. Cl.

*H04N 7/14* (2006.01)
*H04N 21/4788* (2011.01)
*H04N 21/478* (2011.01)

(52) U.S. Cl.

CPC ........... *H04N 7/147* (2013.01); *H04N 21/4788* (2013.01); *H04N 21/47805* (2013.01); *H04N 3/5315* (2013.01); *H04N 7/003* (2013.01)
USPC .................. 348/14.03; 348/14.07; 379/93.03; 379/205.01; 379/265.09; 379/265.12; 709/201; 709/206

(58) Field of Classification Search

CPC ......................... H04M 3/5166–3/5238; H04M 7/0012–7/0057; H04M 2201/42; H04M 2201/50; H04M 2203/40–2203/408
USPC .................... 348/14.01–14.16; 370/259–271, 370/351–357; 379/265.01–266.1, 379/67.1–88.28, 93.01–93.03, 201.01; 455/412.1–420, 426.1, 426.2, 455/550.1–560, 575.1–575.9, 90.1–90.3, 455/90.1–90.3; 709/201–207, 217–248; 704/270–278

See application file for complete search history.

(56) References Cited

U.S. PATENT DOCUMENTS

| | | | |
|---|---|---|---|
| 5,231,569 | A | 7/1993 | Myatt et al. |
| 5,668,897 | A | 9/1997 | Stolfo |

(Continued)

OTHER PUBLICATIONS

International Search Report and Written Opinion for PCT/US2011/031686, Jun. 30, 2011.

(Continued)

*Primary Examiner* — Hemant Patel

(74) *Attorney, Agent, or Firm* — Eric Sophir; Dentons US LLP

(57) ABSTRACT

Embodiments described can more effectively complete complicated service transactions in a more efficient manner by having a team of well-trained professionals who are instantly "streamed" into any location as necessary. A two-way communication system can provide instant or quick access to the right expert at the right point in time, thereby converting what might otherwise be a negative customer experience into a positive sales and service opportunity. A computer implemented method for providing customer support comprises receiving, by a touchpoint device, identification information from a user of the touchpoint device; receiving the identification information; providing an electronic document to the user; receiving an input from the user requesting a session with a representative; selecting a representative based at least in part on the electronic document; providing information about the electronic document to the representative; and establishing a connection between the representative and the touchpoint device.

22 Claims, 9 Drawing Sheets

(56) References Cited

U.S. PATENT DOCUMENTS

| | | | | |
|---|---|---|---|---|
| 6,006,200 | A | 12/1999 | Boies et al. | |
| 6,223,983 | B1 * | 5/2001 | Kjonaas et al. | 235/379 |
| 6,278,982 | B1 | 8/2001 | Korhammer et al. | |
| 6,341,272 | B1 * | 1/2002 | Randle | 705/40 |
| 6,343,738 | B1 | 2/2002 | Ogilvie | |
| 6,418,199 | B1 * | 7/2002 | Perrone | 379/88.01 |
| 6,505,166 | B1 * | 1/2003 | Stephanou | 705/7.14 |
| 7,089,202 | B1 * | 8/2006 | McNamar et al. | 705/35 |
| 7,107,312 | B2 | 9/2006 | Hackbarth et al. | |
| 7,167,855 | B1 | 1/2007 | Koenig | |
| 7,857,207 | B1 * | 12/2010 | Hopkins, III | 235/379 |
| 2001/0042036 | A1 | 11/2001 | Sanders | |
| 2002/0007334 | A1 | 1/2002 | Dicks et al. | |
| 2002/0046279 | A1 * | 4/2002 | Chung | 709/227 |
| 2003/0023531 | A1 | 1/2003 | Fergusson | |
| 2004/0162773 | A1 | 8/2004 | Del Rey et al. | |
| 2005/0010640 | A1 | 1/2005 | Cannata et al. | |
| 2006/0224494 | A1 | 10/2006 | Pinkava | |
| 2007/0168537 | A1 * | 7/2007 | Misra et al. | 709/230 |
| 2007/0185957 | A1 | 8/2007 | Mandalia | |
| 2007/0186158 | A1 | 8/2007 | Kim et al. | |
| 2007/0206086 | A1 * | 9/2007 | Baron et al. | 348/14.01 |
| 2007/0265949 | A1 * | 11/2007 | Elder | 705/35 |
| 2007/0294354 | A1 * | 12/2007 | Sylvain | 709/206 |
| 2008/0048973 | A1 * | 2/2008 | McKay | 345/156 |
| 2008/0133292 | A1 | 6/2008 | Opland et al. | |
| 2008/0281769 | A1 | 11/2008 | Hibbets | |
| 2009/0153646 | A1 * | 6/2009 | Bourguignon et al. | 348/14.11 |
| 2009/0182885 | A1 * | 7/2009 | Sang et al. | 709/228 |
| 2009/0187455 | A1 * | 7/2009 | Fernandes et al. | 705/9 |
| 2009/0222318 | A1 * | 9/2009 | Anelevitz et al. | 705/10 |
| 2010/0036670 | A1 * | 2/2010 | Hill et al. | 705/1 |
| 2010/0174564 | A1 * | 7/2010 | Stender et al. | 705/4 |

OTHER PUBLICATIONS

Polish Office Action and Search Report dated Jul. 30, 2013 in Application No. P-402524, English language summary, 3 pages.

Office Action dated Apr. 16, 2014 corresponding to Mexican Patent Application No. MX/a/2012/011748, 5 pages.

* cited by examiner

SYSTEM AND METHOD FOR PROVIDING CUSTOMER SUPPORT ON A USER INTERFACE

CROSS-REFERENCE TO RELATED APPLICATIONS

This application claims priority to U.S. Provisional Patent Application Ser. No. 61/322,363, filed Apr. 9, 2010, entitled "System and Method for Providing Customer Support on a User Interface," which is hereby incorporated by reference in its entirety.

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF THE INVENTION

The present invention relates to a method and system for video communication between a user and a customer service representative.

BACKGROUND

Financial institutions provide a vast array of financial services and products to customers and potential customers. Traditionally, the process for selling a product to a customer and servicing a customer has been predominantly in person, over the telephone, or via the Internet. When communicating with a customer service representative, even over the telephone or in person, that representative may not be able to answer a customer's questions about a particular product or service outside their area of expertise. As a result, the customer must be directed to an expert, if one is even available.

Typically, the customer must enter details about themselves and their desired transaction in order to be connected to the appropriate representative. When connecting with a call center, the customer can become frustrated and spend unnecessary time just trying to connect with a representative than can assist. Moreover, if the customer has traveled to a branch or physical location of a financial institution, that particular branch may not employ any representatives who can answer the customer's questions. Obviously, such a situation proves frustrating for customers and can result in a lost sales opportunity for the financial institution.

From the customers' point of view, customers desire a personal experience of a face-to-face interaction with an expert who can answer a question about a product or help a customer to properly complete a form. From the financial institution's point of view, the financial institution cannot reasonably expect to employ an expert on each of the vast number of products and services it offers in every branch at all times.

Accordingly, there is a need for a system and method for automatically selecting and connecting a customer service representative to a user of a financial product or service without requiring the user to enter additional information about the product or service they are using.

SUMMARY OF THE INVENTION

The multitude of products and features available through a large organization, such as a financial services institution, make it virtually impossible for one individual or even a group of individuals to be fully conversant in all the nuances necessary to properly service a customer in each product. Video conferencing or video "chat" is one way to offer a customer of a financial institution an opportunity to conduct a face-to-face communication with a customer service representative, no matter where the user is located and at a reasonable cost to the organization. Unfortunately, in order to provide a video chat between a user and an appropriate representative, multiple, time-consuming steps are required. First, the user must be identified. Second, the product or service of interest must be identified by the user. Third, the correct expert must be identified and connected with the user. And, finally, many conventional devices and methods used for conducting financial transactions or inquiring about services are not equipped with video capabilities.

Exemplary embodiments described herein make it possible to effectively complete more complicated service transactions in a more efficient manner by having a team of well-trained professionals who are instantly "streamed" into any location as necessary. In addition, the below-described embodiments may enable any division's products to be serviced at any other division's location. Further, the described embodiments may allow customers to reach an "appropriate" customer representative—a customer representative with the knowledge, experience, expertise, and/or skill to answer questions about a particular product, form, or service. The embodiments described herein attempt to overcome all of the aforementioned drawbacks of conventional customer service representative systems and methods.

A two-way communication system can provide instant or quick access to the right expert at the right point in time, thereby converting what might otherwise be a negative customer experience into a positive sales and service opportunity. As an added benefit, embodiments described herein have a multitude of other cost-effective uses (e.g., training, communications, security, acquisition support, remote customer identification, remote sales and service, etc.), which can enhance an organization's value. Exemplary embodiments may include transmissions with only voice or audio, only video, or both voice/audio and video, along with optional texting and email capabilities.

In one embodiment, a computer implemented method for providing customer support comprises receiving, by a touchpoint device, identification information from a user of the touchpoint device; receiving, by a server, the identification information; providing an electronic document to the user; receiving, by the server, an input from the user requesting a session with a representative; selecting, by the server, a representative based at least in part on the electronic document; providing information about the electronic document to the representative; and establishing a connection between the representative and the touchpoint device.

In another embodiment, a system for providing customer support comprises a server of a financial institution adapted to provide an electronic document to a touchpoint device in operation by a user; a first database communicatively coupled to the server and adapted to store the electronic document; a second database communicatively coupled to the server and adapted to store account information of the user; and a workstation communicatively coupled to the server and configured to be operable by a customer service representative. The workstation comprises a camera for capturing video of the customer service representative; a microphone for capturing audio of the customer service representative; a display for presenting information about the electronic document provided to the user; and an input device configured for the customer service representative to input commands to access information about the user or the electronic document. The user can access video and audio of the customer service representative on a display of the touchpoint device upon a request by the user. The server directs the request of the user for video and audio of the customer service representative to a particular customer service representative that has expertise relating to the electronic document.

In yet another embodiment, a method for providing customer support comprises providing a user interface to a user to display on a touchpoint device; providing a first area of the user interface to display an electronic document; providing a second area of the user interface that has a link for requesting assistance from a customer service representative; receiving a selection by the user of the link for assistance; routing a request for assistance to a particular customer service representative based on the electronic document displayed in the first area of the user interface; establishing a video feed of the customer service representative from a computer of the customer service representative to the user's touchpoint device; and providing the video feed of the customer service representative in the first area along with the electronic document.

Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The preferred embodiments of the present invention are illustrated by way of example and not limited to the following figures.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Exemplary embodiments, as described below, expand the reach of consumer service representatives with a particular area of expertise, thereby allowing a financial institution to present customer service representatives to more customers at multiple locations and at a time when their sales and service expertise can mean the difference between solidifying a client relationship or losing the business to a competitor. These systems and methods can remove the geographical barriers that prevent a customer from accessing a specialist's knowledge in essentially real-time and allow the customer to operate in an environment that embraces the customer in the process. For example, the customer is able to meet directly with specialists in an electronic environment that creates a virtual meeting experience in which the customer will feel as if he or she is sitting across a desk from the specialist. Moreover, exemplary embodiments allow the customer to connect with a representative with particularized knowledge about an electronic document being viewed or completed by a user, without the need for the user to enter additional information about the document. As a result, the customer may not be required to enter personal information or any additional information about a desired product or service in order to speak with an appropriate representative. Instead, the customer is immediately connected to a representative who has knowledge of the customer's current status.

Figure 1:
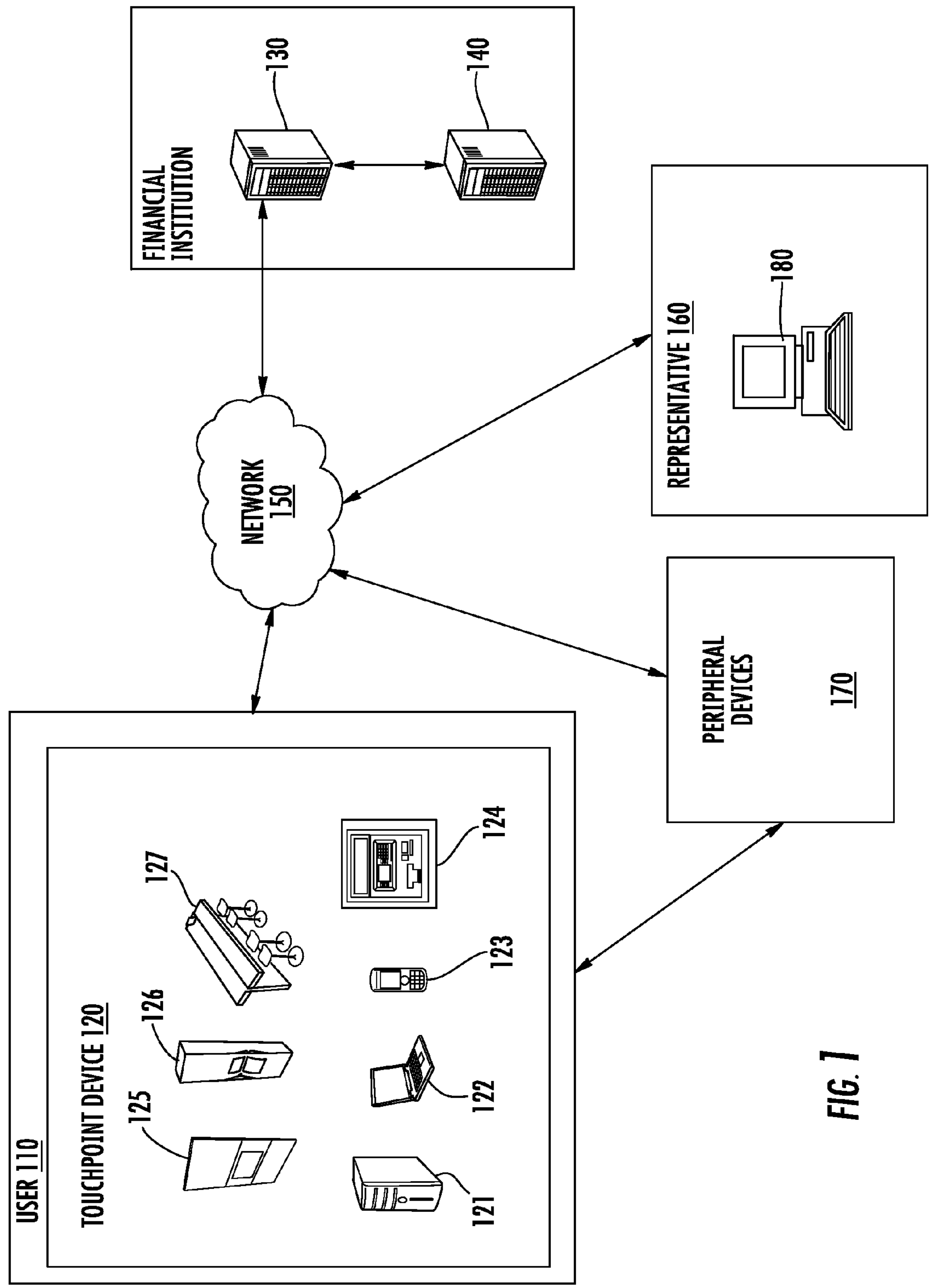
FIG. 1 shows a system architecture according to an exemplary embodiment.

Referring to FIG. 1, a user 110 operates a touchpoint device 120, such as a personal computer 121, general computer or special purpose computer 122, cellular or mobile phone 123, automated teller machine (ATM) 124, kiosk 126, personal digital assistant (PDA), tablet computer, wireless device, video phone, smart phone, or any other electronic device capable of processing data to access financial products, services, or information located on server(s) 130 (including processors, software, etc.) and/or database(s) 140 of a financial institution. The touchpoint device 120, server 130, database 140, and a customer service representative 160 having a computer 180 can communicate via electronic transmissions through communication networks 150 such as the Internet, intranets, wireless networks, Bluetooth networks, fiber optic networks, existing telephone networks, credit networks, and other networks.

It will be understood that a "user" 110 of a touchpoint device 120 includes entities including, but not limited to, existing and prospective customers of financial institutions, service and sales agents, employees, managers, groups of individuals, or another entity with an existing or potential relationship with the financial institution. For example, the user can be a customer that has an account at the financial institution. In another example, the user can be a potential customer interested in obtaining a mortgage with the financial institution. In yet another example, the user can have an account at another financial institution but is using the device or services (e.g., an ATM) of another financial institution.

Furthermore, it will be understood that the touchpoint device 120 may be portable or it can be physically located at a branch of a financial organization, a user's home or office, a transit station, a convenience store, a shopping mall, or any location where the device can be connected to a network. For example, a mobile phone 123 may access the network 150 at nearly any location in world. In another example, a kiosk 126 may be located at a branch of the financial institution. Using an input device connected to the kiosk, the user can choose and manipulate electronic documents. In yet another example, an ATM 123 can be located at a store, a branch, or almost any location throughout the world. In another embodiment, a user may log on to the system using a laptop computer located at the user's place of work.

The touchpoint device can include three components: (a) a processing component, (b) a display component, and (c) an input component. The processing component can include a computer processor necessary for handling the computations, processing, and other functionality of the device. The display can be a LCD, LED, OLED, CRT, 3D or stereoscopic screens, projectors, or any other type of display. The display component can be a screen capable of touch screen input. In one example, the display component, input component, and processing component may be combined into a single touchpoint device 120 to allow a user to enter information by touching the screen of the touchpoint device. As a result, the screen acts as the input component. Alternatively, the device can receive input from an input component instead of or in addition to a touch screen capability. In one example, the kiosk 126 may include a special purpose computer comprising a display component, processing component and an attached input component, whereby the kiosk 126 may be programmed to display a particular GUI. Exemplary input devices may include, for example, buttons, switches, dials, sliders, keys or a keypad, a navigation pad, touch pad, touch screen, mouse, trackball, stylus, and the like, any of which can be integrated in the touchpoint device or electrically coupled thereto.

Optional enhancements to the touchpoint device can add additional service features or maintain a secure session with the user. In certain embodiments, peripheral devices 170 may be connected to, or integrated in, a touchpoint device 120 to enhance a user's 110 experience. The peripheral devices may be connected through the network 150, though they may also be physically connected or even connected via a different network. Exemplary peripheral devices 170 may include video cameras, display devices, speakers, processors (along with software to carry out the process), input devices, biometric devices (e.g., for fingerprints, iris scan, facial recognition, voice recognition), printers, scanners, deposit/dispense devices, card readers, bar code readers (including QR code readers), PIN pads/electronic signature capture, remote camera controls, and other devices without limitation.

In one exemplary embodiment, a printer may be connected for the remote printing of documents, debit or credit cards, and/or physical representations of bookmark identifiers such as bar codes or QR codes. In another embodiment, a scanner is present for the scanning of checks, documents, currency identification cards, or other identification or financial documents. Additional embodiments include peripheral devices 170 such as card readers for reading magnetic stripe and/or smart cards, such as credit and debit cards. In yet another embodiment, a remote camera controller is included such that, for example, a representative can control a camera connected to a touchpoint device to view a customer's document. In this way, a customer could "show" the representative a certain line from a physical document.

In one embodiment, a "Marketing Wall" or other advertising display, which is positioned outside of a branch or near an entrance to the branch, can draw the user 110 inside the branch to use a touchpoint device 120 by electronically or statically displaying information. For example, the Marketing Wall can include a display device, such as an LCD display, LED display, or OLED display and, optionally, speakers. The Marketing Wall may be programmed to display marketing materials to customers or potential customers such as promotions, ads, videos, music, and graphics in an attempt to coax the person to enter the branch. Once inside the branch, the user 110 may log in to one of a number of touchpoint devices 120 located throughout the branch including "Sales Walls" 125 and "Workbenches" 127. A Sales Wall 125 is a display within the branch that allows the user to complete a transaction or interact with the presented information. A Workbench 127 is similar to the Sales Wall, but has a configuration of a display on a surface of a desk for user interaction.

In one embodiment, the touchpoint device 120 is a type of kiosk known as a "360 Station" 126, wherein a user 110 can conduct financial transactions such as, for example, depositing cash or checks, withdrawing cash, and/or opening or closing an account. The 360 Station 126 can be similar to an ATM or may include additional functionality.

As discussed above, whether in the branch or at another location (e.g., en route, at home, at work, at a transit station, or other location), the user can access information from a financial institution through any of the touchpoint devices 120, including, but not limited to, the Sales Wall 125, Workbench 127, 360 Station 126, personal computer 121, general computer or special purpose computer 122, tablet computer, ATM 124, kiosk 126, PDA, wireless device, video phone, cellular or mobile phone 123, or smart phone.

The customer service representative 160 can be located at the financial institution or at a separate location. In either scenario, the customer service representative 160 has computer 180 for communicating the user 110 of touchpoint device 120. The computer 180 of customer service representative 160 can have a camera for capturing video of the customer service representative 160, a microphone for capturing audio of the customer service representative 160, a display for showing information about the customer and the electronic document, and an input device for allowing the customer service representative 160 to input commands to access information about the user 110 or the electronic document.

Once the user 110 submits a request for a video chat, videoconference, or other video session with a customer service representative 160, the financial institution's server 130 can route the request to an appropriate customer service representative 160 with expertise in the desired area. The financial institution's server 130 can also provide information, such as information about the electronic document being viewed by the user 110, account information about the user 110, and personal information about the user 110 to the computer 180 before or during a video session with the user 110. The financial institution's server 130 may retrieve some or all of this information from the at least one database 140. For example, the financial institution may have a first database for storing account information and a second database for storing information about the electronic document. The at least one database 140 can store information about each electronic document, whereby the server 130 can request a subject matter for a particular electronic document in order to route related requests to a corresponding representative for that particular subject matter.

Figure 2:
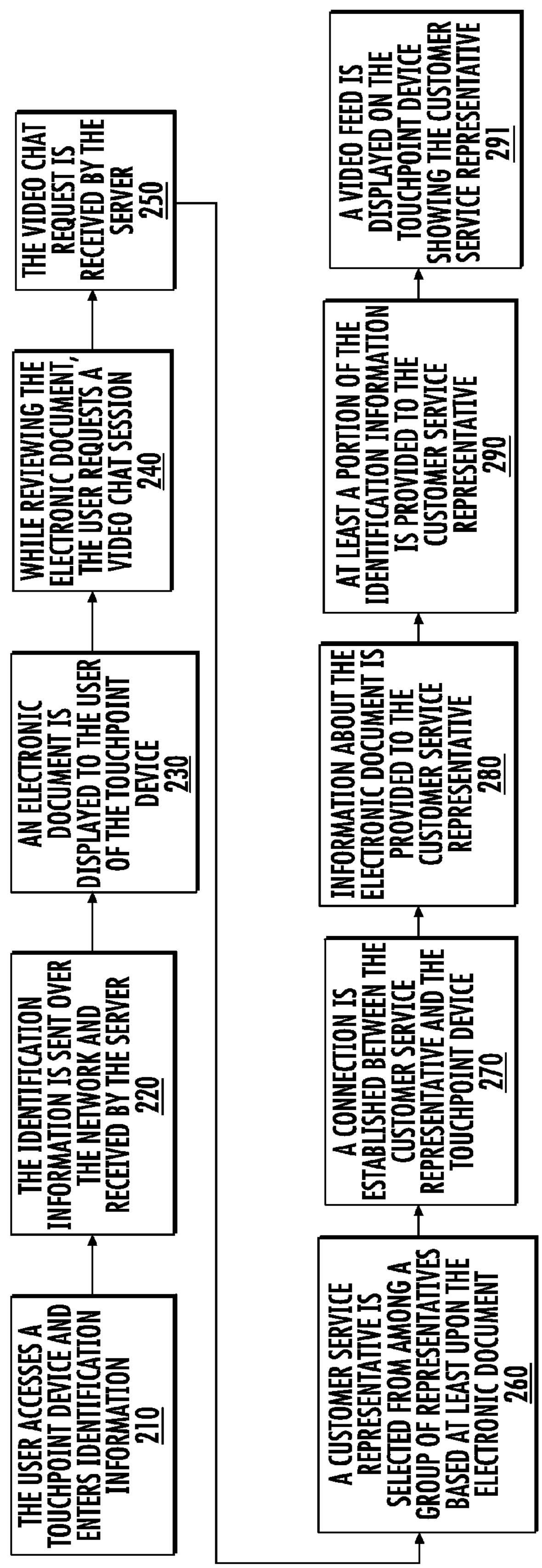
FIG. 2 is a flow chart of a method for establishing a communication according to an exemplary embodiment.

Referring to FIG. 2, an exemplary method for presenting financial information is shown that uses the exemplary system of FIG. 1. It will be recognized that the exemplary method of FIG. 2 may be executed in a number of ways, and the following description should not be limited to a particular order. In this example, a user can interact with a touchpoint device to receive, review, and access information presented by the financial institution. The user may or may not be a customer of the financial institution. In this particular example, the user is an account holder of the financial institution. In an alternative embodiment where the user is not an account holder of the financial institution, the user can obtain a temporary user name and password, register for access, or proceed without entering any personal information.

At 210, a user accesses a touchpoint device and is prompted to enter identification information. The user can enter the identification into the touchpoint device through any input mechanism, including a keypad or a biometric input. The identification information required may be any information that identifies and verifies the user to the financial institution and may include, for example, the user's name, address, phone number, social security number, account number, pin number, age, sex, race, ethnicity, username, password, or any such information. If the user is logging into the system for the first time, the system may require the user to provide a user name and password. If the user has already established a username/password combination, the user may enter the information at a sign-on screen. Additionally, the system may prompt the user to store the username and password either locally or on the network server. In an alternative embodiment, the attached peripheral devices may be used to recognize and authenticate the user, including facial recognition, retina scan, voice recognition, fingerprint scan, or the like.

At 220, the identification information is sent over the network by the touchpoint device and received by a server of the financial institution. In one embodiment, the identification information is stored, for example, locally on the touchpoint device. Alternatively, the identification information can be stored on the server or in a database. Once entered, the identification information may be accessed by employees of the financial institution and/or customer service representatives.

As discussed below, at least a portion of the identification information can be automatically provided to the customer representative when such service is requested by a user, thereby allowing the user to be identified by the representative without having to enter additional information. In another embodiment, the identification information may be automatically populated into electronic documents being completed by a user on a touchpoint device.

Referring to 230, an electronic document is displayed to the user on the touchpoint device. The electronic document, such as a word processing document, web page, spreadsheet, video, picture, or any other type of electronic file that presents information to the user contains financial information, and may be any form, document, application, agreement, contract, offer, advertisement, pamphlet, manual, or product offered by the financial institution. Therefore, if an electronic document contains fields for user input, a user may enter information into the fields using the input device of the touchpoint device.

In one embodiment, the user is presented with the option to view a number of electronic documents upon logging into the system. The options displayed to the user are chosen based on a number of factors including, but not limited to, the identification information entered by the user, any stored information previously provided by the user or a third party, other electronic documents previously completed or reviewed by the user, information entered by an employee of the financial institution, or even randomly. In another embodiment, the user may log into the system to request a particular electronic document.

In a first example, the user reviews a financial institution's offerings on mortgage rates. The user can read about the different types of mortgages, such as a 30 year fixed or an adjustable rate mortgage. The user can also access available rates offered by the financial institution. The financial institution can also present a calculator to allow the user to determine a monthly payment based on various configurations. If the user has decided on a particular mortgage product, the user can fill out a mortgage application.

While reviewing the mortgage information or completing the mortgage application, the user may have a question about the specific content or the technical operation of the touchpoint device. If the user is accessing the information on a touchpoint device such as a mobile phone or personal computer, it has been conventionally inconvenient for the user to track down a customer service representative. When using a touchpoint device, such as a kiosk or an ATM, at a branch location or even at a remote location, the customer service representative specializing in mortgages may not be working at that branch location. However, the user interface of the touchpoint device allows the user to access a customer service representative that specializes in the financial product currently being reviewed by the user. In the example above where the user is reviewing mortgage information, the user can connect immediately with a customer service representative specializing in mortgages.

At 240, as the user is reviewing an electronic document, the user desires assistance with the electronic document. The user inputs a selection into the touchpoint device requesting a video chat session. Rather than require the user to navigate a telephone or graphical menu to select a particular customer service representative, the system connects the user with a customer service representative having particularized knowledge about the electronic document that the user is currently viewing. As an example, the touchpoint device may contain a physical button or a hyperlink labeled, "Call Representative." Upon pressing the "Call Representative" button, a request is sent by the touchpoint device through the network and received by the server. In another example, the touchpoint device may contain a digital button or icon displayed within a graphical user interface displayed on the touchpoint device. In still other embodiments, voice recognition and interactive voice response is incorporated such that the user may simply say, e.g., "Call Representative."

At 250, a video chat request is received by the server and at 260 a customer service representative is selected from among a group of representatives based at least upon the electronic document being displayed by the touchpoint device. For example, if a user is completing a mortgage application, a customer service representative would be selected from among the available representatives based upon his expertise in helping customers to complete mortgage applications. As another example, if a user chooses to call a representative while reviewing documentation on available credit card offers, a representative who has expertise in, for example, a financial institution's available credit and debit card offers would be selected. In order to determine which representative is best suited to help a customer with a particular electronic document, information about each representative's expertise is stored, for example, in a database on the server. This information may be accessed by the server when a request for a representative is received and the database may be updated as a representative's knowledge base grows. Additionally, information, such as user satisfaction scores, the number of users helped, names and account numbers of users helped, and other information may be stored in the database.

In another embodiment a customer service representative is chosen from a group of qualified representatives based upon a variety of additional factors, including, but not limited to, the age of the user, whether the user has previously dealt with a certain representative, the amount of money requested or at issue, the net worth of the user, other documents the user has reviewed or completed during the instant session or previous session, and any number of factors contained within the user's identification information without limitation.

The customer service representative may be selected based on the language spoken by that representative and/or the language of the electronic document being viewed by the user. For example, if a user is applying for a credit card in English, an English speaking customer service representative will be chosen. In an alternative embodiment, a user may select his preferred language at any time while using a touchpoint device, including but not limited to, at an initial setup stage, upon requesting a video conference, or while setting up preferences for an account. Additionally, a customer service representative fluent in a certain language may also be chosen based upon a user's IP address, mobile phone number, or GPS location. For example, if a new user logs into the system from a computer in the United States of America, the default language of the representative chosen may be English. Alternatively, if a new user dials into the system from a mobile phone having a Japanese phone number, the customer service representative chosen may be fluent in at least Japanese. In yet another alternative, the language of the customer service representative can be based upon a default language for the country where the user resides.

Once the customer service representative is selected, a connection is established via the network between the representative and the touchpoint device 270, and information about the electronic document is provided by the touchpoint device to the customer service representative 280. In one example, if a user is reading documentation on a product or service, the entire electronic document or a subset of the document may be sent to the representative with an indication of which page is being viewed by the user. In another example, if a user is in the process of completing a form, both the form and the information entered into the form's fields by the user are provided to the representative. In yet another example, the user's screen is shared with the representative, allowing the representative to manipulate the electronic document. In a further embodiment, the electronic document is not sent to the representative, rather information about the document, such as but not limited to title, author, form number, page number, completed pages, time viewed, subject matter and the like are sent.

At 290, at least a portion of the identification information is provided to the customer service represent via the network. The user, therefore, does not have to spend time identifying himself or verifying his information with the representative. However, even if the identification information is provided to the representative, the representative may require the user to provide verification information, such as a password or personal identification number.

At 291, a video feed is displayed on the touchpoint device showing the customer service representative and allowing the representative to interact with the user. The video feed may include audio, video and text messaging. The video provided to the user include includes full duplex video and audio at a sustained rate, as an example, of 30 frames (60 fields) per second fully interlaced in both point-to-point and multipoint environments. The capability also includes lower levels of video and audio quality if the customer is using the service on a low speed connection. Additionally, the audio and video may be provided to the user in separate streams which are synchronized at the touchpoint. The video may be presented to the user of a touchpoint in a stand alone window, a "pop-up," or may be fully integrated into the graphical user interface ("GUI") of the touchpoint. In one embodiment, the video may be expanded to encompass the entire display device of the touchpoint.

Optionally, if the touchpoint is equipped with a camera, a video feed of the user can be shown to the customer service representative. This video feed may be automatically presented upon activating the video feed from the customer service representative or it may require activating an additional button or link. Similarly, an audio feed from the user may be activated automatically or upon depressing a button (physical or electronic) or link.

The user can terminate the video session with the customer service representative by selecting a button or link to end the session. Alternatively, the user can sign out of the secure session. In another alternative, the customer service representative can terminate the session. Once a session is terminated, a video display on the user interface can be minimized or be closed, and the user can return to the electronic document.

In another embodiment, the video chat session with the representative is recorded and stored in a database either locally or on the server. The video is stored, for example, digitally and maintained as records for a certain amount of time. Storage may be in the form of a hard drive type system and the video may be stored, for example, as MPEG files. These stored videos may be accessed by the user at a future time and from a different location such as, but not limited to, a personal computer. The videos may also be accessed by employees of the financial institution for training purposes.

In another embodiment, a representative may review documents with a user and permit the customer to execute documents and record the execution, as well as, have the executed documents transmitted to the representative. In one example, a user may complete and execute a credit card application with a representative.

Multipoint capabilities are further provided in an exemplary embodiment. For example, a representative speaking with a customer could bring a second representative onto the screen, introduce that expert, and then leave the session with the second expert taking over the session. In addition, one person could broadcast to all individuals on the system or any number of nodes on the system could be hooked up for a video conference.

A backchannel voice feature is also provided in embodiments of the present invention, wherein multiple voice channels are provided for private communications. For example, a sales representative interfacing with a customer could be coached in real time by a senior manager without the customer realizing. As another, non-limiting example, two senior managers running a multipoint conference could communicate with each other in private during the call. Moreover, should an expert have the need to remove himself from the live video screen, he has the capability to put the customer on hold, showing the customer a static image or a dynamic screen, e.g., advertisements. In the situation where a customer requests a video chat, but receives a busy signal, the customer would be able to leave a video mail, similar to voicemail for phones, for the expert to reach the customer when available.

Figure 3:
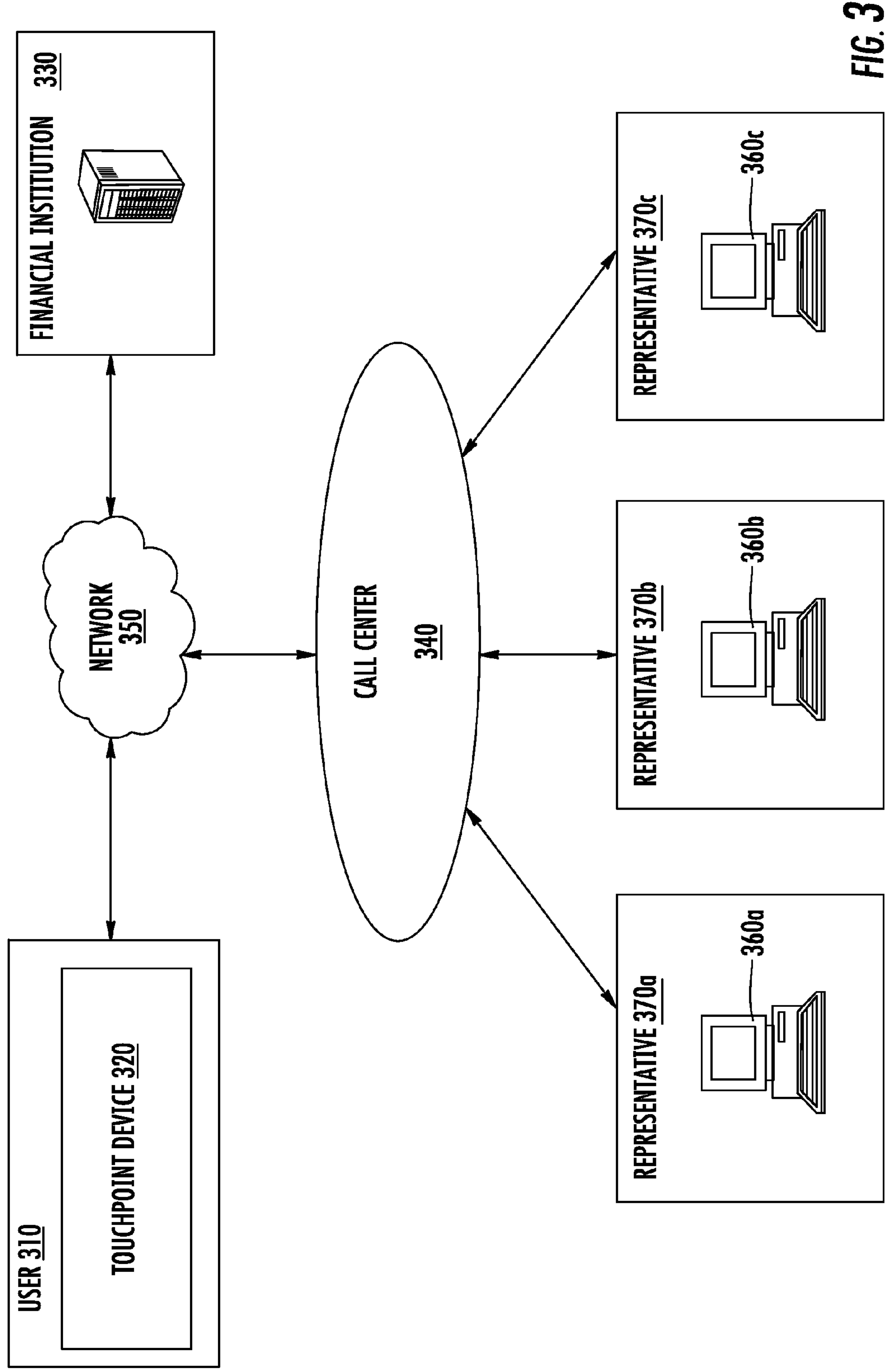
FIG. 3 is a system overview according to an exemplary embodiment

A further embodiment of the present invention provides for video conference services to be delivered through a call center. Referring now to FIG. 3, the call center 340, for example, may be a communications hub with routing and processing capabilities. The call center 340 may receive signals from the touchpoint device 320 in operation by the user 310 and/or the financial institution's server 330 via the network 350.

In the exemplary embodiment shown in FIG. 3, the call center 340 is a separate entity from the financial institution. Therefore, the selecting of customer service representatives can be based on the electronic document being viewed by the user 310 may be processed or executed by the call center 340. The call center 340 can obtain information from the financial institution's server 330 regarding the electronic document. The call center 340 can then determine the type of customer service representative based on information about the electronic document.

In an alternative embodiment, the selecting of a particular customer service representative with expertise in the electronic document being viewed by the user 310 is done by the financial institution. The financial institution's server 330 recognizes the type of electronic document being viewed on the touchpoint device 320 by the user 310 and sends a message through the network 350 requesting that the call center 340 connect a customer service representative 370 with expertise in the subject matter of that electronic document. The message request sent from the financial institution's server 330 to the call center 340 can also include information about the electronic document and the user 310.

The call center 340 can connect a plurality of customer service representatives 370*a*, 370*b*, 370*c* to the user 310 based on the electronic document. Each customer service representative 370*a*, 370*b*, 370*c* has a workstation 360*a*, 360*b*, 360*c* for reviewing information about the electronic document as well as communicating with the financial institution's server 330 and the touchpoint device 320. The workstation 360*a*, 360*b*, 360*c* can have a camera for capturing video of the customer service representative, a microphone for capturing audio of the customer service representative, a display for showing information about the customer and the electronic document, and an input device for allowing the customer service representative to input commands to access information about the user 310 or the electronic document.

In one example, if the electronic document being reviewed by the user 310 on the touchpoint device 320 discusses mortgage information, then a request by the user 310 to chat with a customer service representative would be routed to one of the customer service representatives 370*a*, 370*b*, 370*c* with expertise in mortgages. The financial institution's server 330 or the call center 340 can determine the type of customer service representative needed and appropriately route the request. The call center 330 then routes the necessary information to the selected representative 360 and establishes a connection to the touchpoint device 320 via the network 350. The customer service representative 370*a*, 370*b*, 370*c* can then initiate a videoconference or video session with the user 310.

Figure 4A:
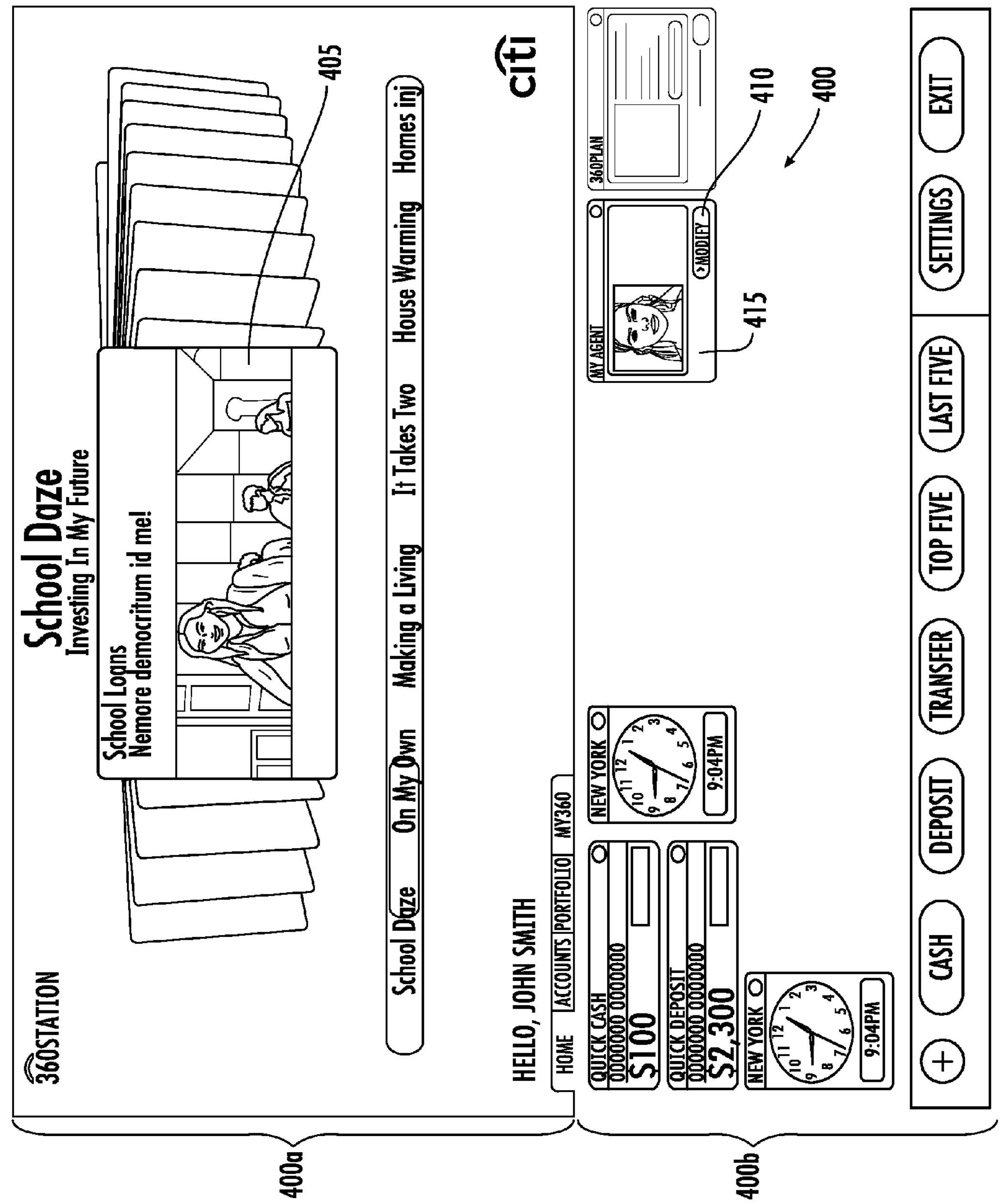
FIGS. 4*a* and 4*b* show screen shots of a user interface on a touchpoint according to an exemplary embodiment.
Figure 4B:
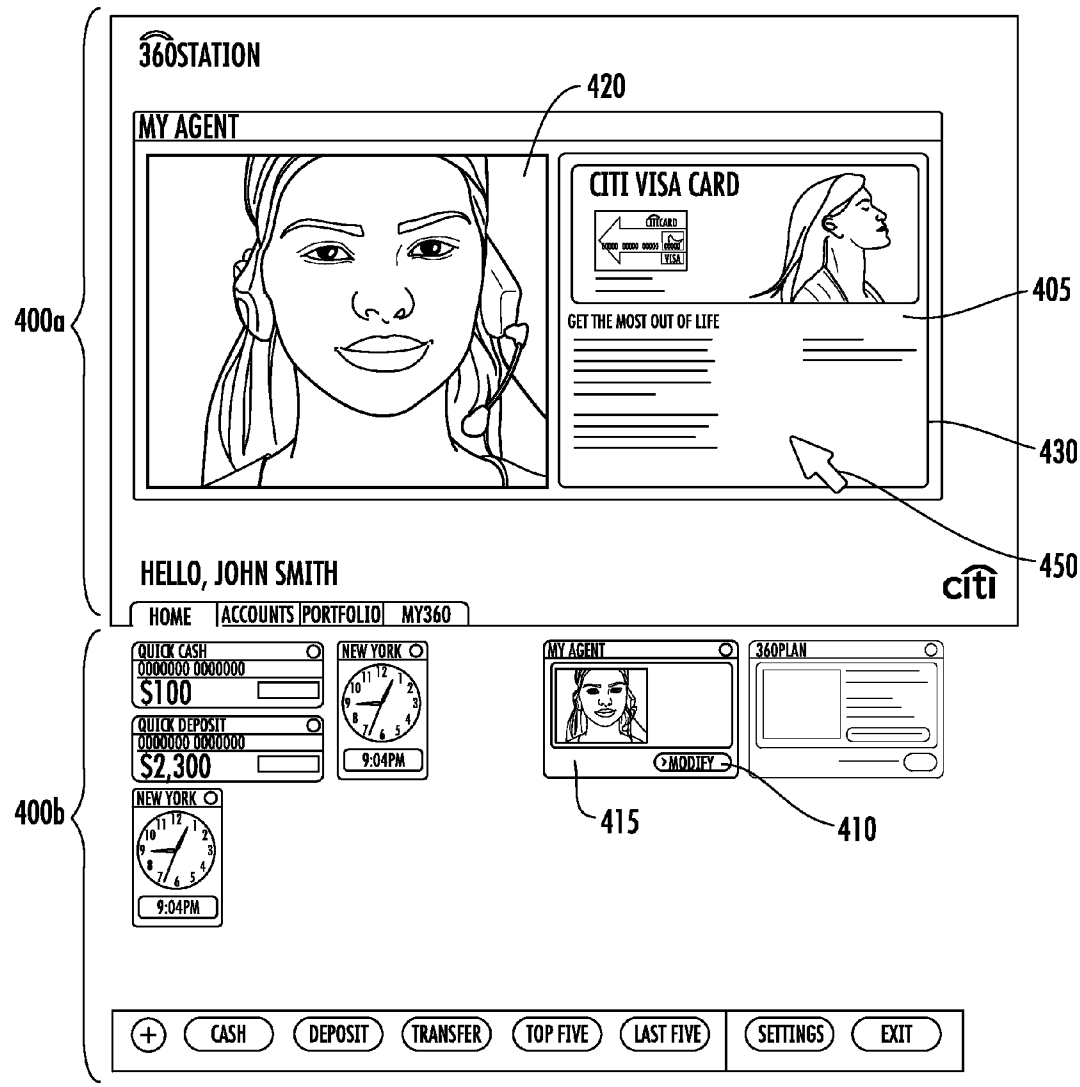

Referring to FIGS. 4*a* and 4*b*, screenshots of a customer user interface according to an exemplary embodiment are shown. As shown in FIG. 4*a*, a user of a touchpoint device, such as a 360 Station or a mobile phone, is reviewing an electronic document 405 having information about school loans on a graphical user interface 400 presented on the screen of the touchpoint device. At any point during the session, the user may input a selection to request assistance from a customer service representative regarding the electronic document 405 the user is viewing. The electronic document 405 can be presented in a first area 400*a* of the graphical user interface 400. In this example embodiment, the user may use an appropriate input device or touch the touch screen of the user interface 400 to select the image, button, or link 410 labeled "My360 Help" in a customer service window 415 called "My Agent." The customer service window 415 can be presented in a second area 400*b* of the graphical user interface 400.

At FIG. 4*b*, once the user has selected the "My360 Help" link 410, the user interface 400 presents a customer service representative in a representative video window 420, which is integrated into the user interface 400 in the first area 400*a*. The customer service representative may be provided with information about the electronic document 405 that the user is viewing, and a second window 430 may be displayed on the user interface 400 in the first area 400*a* showing a version of the electronic document 405.

Although shown as two separate windows in FIG. 4*b*, it will be appreciated that the number of windows, size, appearance, and layout of the customer representative window 420 and electronic document window 430 may vary depending on many factors including the type of touchpoint device being used to access the electronic document, the hardware, software, and display components of the touchpoint device, and/or the user's preference. In certain embodiments, the user may control the size and appearance of each window. In other embodiments, the customer service window 420 and electronic document window 430 may be a single window. In yet other embodiments, the some or all windows in first area 400*a* can be positioned in second area 400*b* and some or all windows in the second area 400*b* can be positioned in first area 400*a*.

In an example embodiment, the customer service representative may gain access to the touchpoint device, including the ability to enter data and control the cursor. In this way, the representative may guide the user through the completion of the electronic document, or illustrate a particular point to the user. In this particular example, the customer service representative can use a pointer 450 to direct the user to a certain location within the electronic document 405. In another embodiment, the representative may type information, such as instructions or greetings to the user, and the information will be displayed on the touchpoint device.

Figure 5A:
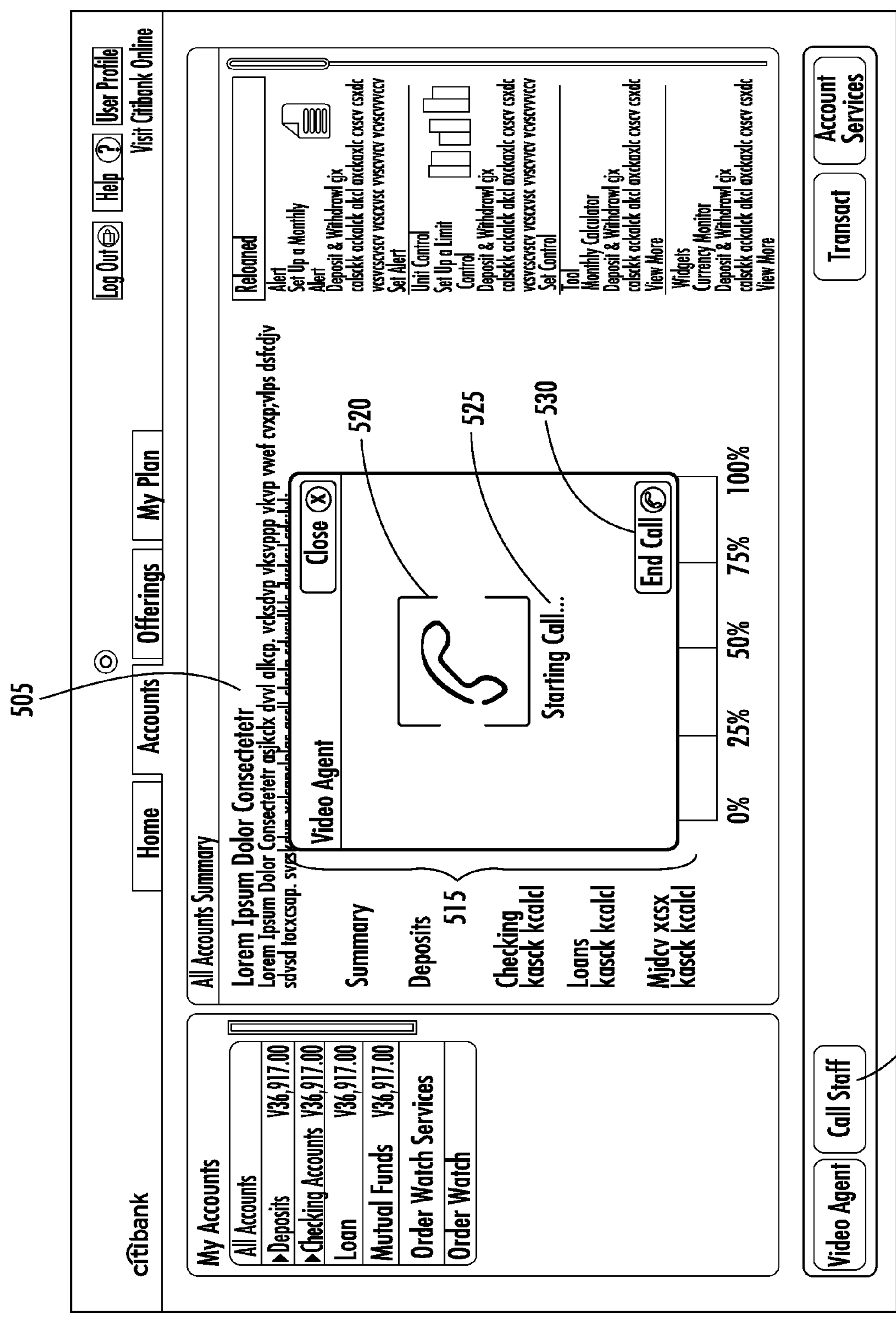
FIGS. 5*a* through 5*d* show screen shots of a user interface on a touchpoint according to an exemplary embodiment.

Referring to FIGS. 5*a* through 5*d*, screenshots of a customer user interface according to an exemplary embodiment are shown. As shown in FIG. 5*a*, a customer of the financial institution is using a touchpoint device, such as a Workbench or a 360 Station. The user is reviewing an electronic document 505 containing a summary of the user's account on a graphical user interface 500 presented on the screen of the touchpoint device. The user has inputted a selection to request assistance from a customer service representative regarding the electronic document 505 being viewed by the user by pressing the "Call Staff" button or link 510 located on the screen of the touchpoint device. The electronic document 505 remains in the background of the graphical user interface 500, while a customer service window 515 called "Video Agent" appears or pops-up in the foreground. Within the customer service window 515, a first display area 520, may display a picture, video, text, or icon. In this example embodiment, an icon of a phone is displayed in the first display area 520. In an alternative embodiment, a video feed from a camera connected to the user's touchpoint device may be displayed.

Other information, such as status information 525, may be displayed within the customer service window 515 to inform the user about the condition of the video chat session. In this example, the status information 525 displayed to the user is "Starting Call . . . ," informing the user that a call to a representative is in progress, but the user is not yet connected to a representative. The user is additionally presented with an option to end the video chat session at any time by selecting the termination button or link 530, which is labeled "End Call" in this example. It will be appreciated that the user may end the video chat session at any time after initiating a video chat session.

Figure 5B:
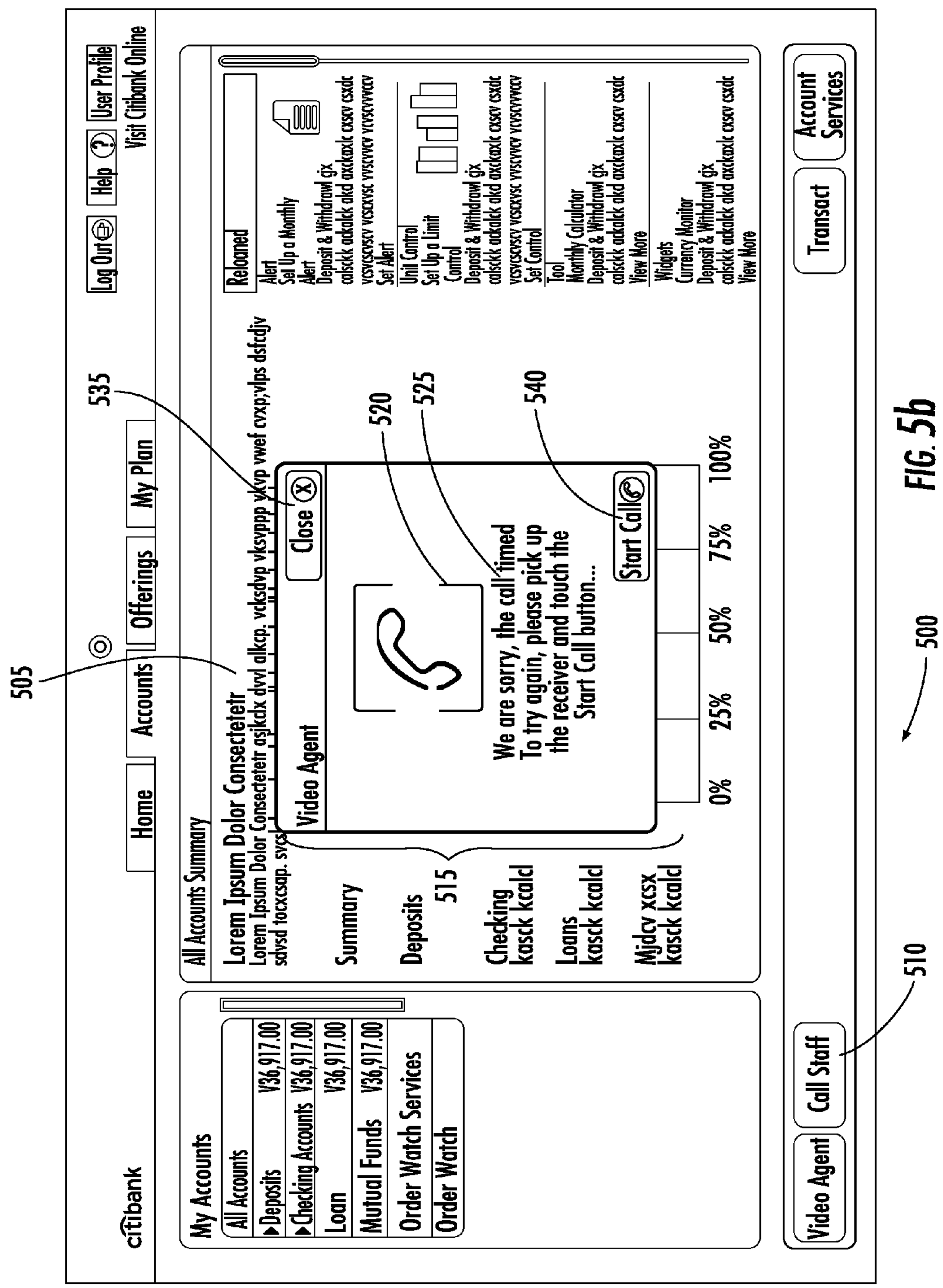

At FIG. 5*b*, if the video chat request is unsuccessful for any reason, the status information 525 displayed within the customer service window 515 informs the user of the following: "We are sorry, the call failed. To try again, please pick up the receiver and touch the Start Call button." The user is therefore presented with an option to attempt another connection by selecting the "Start Call" button or link 540. If, alternatively, the user does not want to continue with the video chat request, the user may end the session and close the customer service window 515 by selecting the "Close" button or link 535. In an alternative embodiment, the system may repeatedly attempt to secure a connection to a customer service representative until the connection is successful or the system may attempt a pre-determined number of tries to connect before displaying the appropriate status information 525.

Figure 5C:
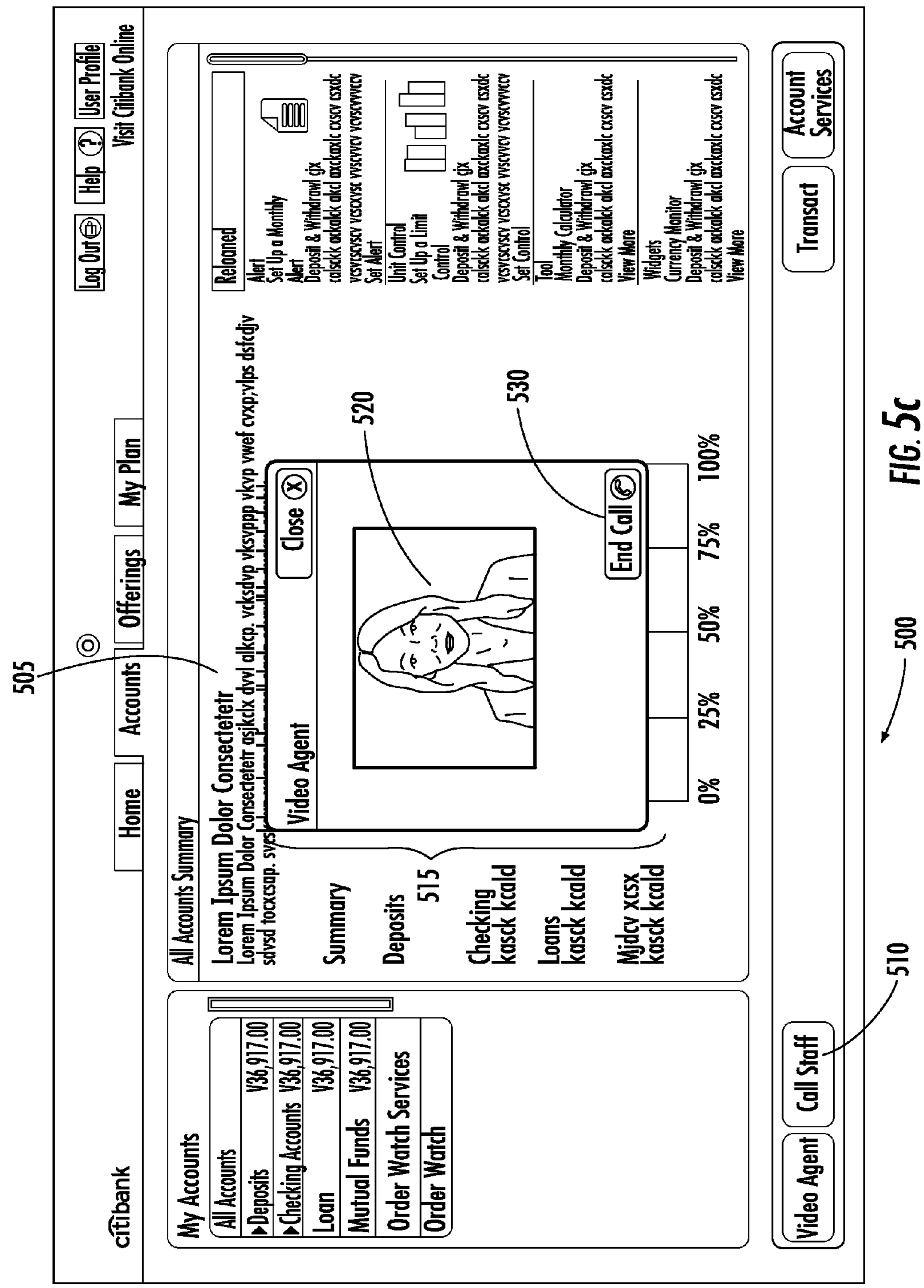

At FIG. 5*c*, if the connection to a customer service representative is successful, a picture or video of the customer service representative appears within the first display area 520 of the customer service window 515 displayed in the foreground of the graphical user interface 500. It will be appreciated that the customer service window 515 may be moved, resized, minimized, maximized, or closed. For example, a user may minimize the customer service window 515 and continue to work on the electronic document 505 while receiving audio instructions or clarification from the customer service representative. In another example, the user may maximize the customer service window 515 to full-screen size in order to read a physical document that is shown to the user by the representative.

Figure 5D:
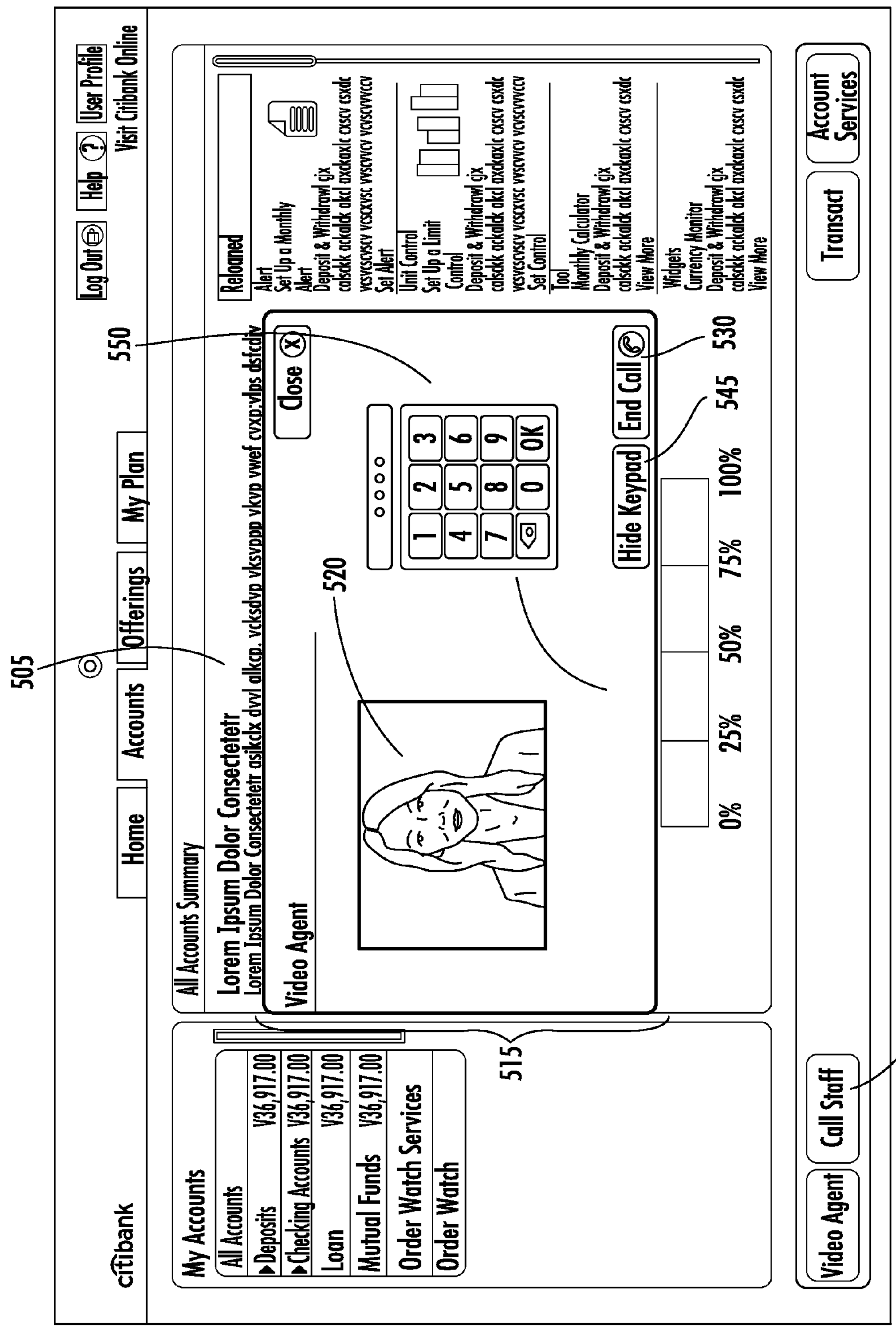

At FIG. 5*d*, the customer service window 515 is expanded to include a second display area 550. In this example, a pin-pad is displayed within the second display area 550. Additionally, the user is presented with the option to hide the second display area 550 by selecting the button or link called "Hide Keypad" 545. Using the pin-pad, a user may enter numbers into the system, which may then be read by the customer service representative. For example, the representative may ask the user to confirm his pin number for a certain account in order to verify the user. In another embodiment, if the user wishes to ask the representative a question about a different electronic document, the user may enter a bookmark number corresponding to that electronic document. The representative can then either read the bookmark entered to obtain the corresponding document from the system, or the document may be displayed automatically to the representative.

Although a pin-pad is displayed in the second display area 550 in this particular embodiment, it will be recognized that, in other exemplary embodiments, any number of input devices or system outputs may be displayed in the second display area 550, such as but not limited to, keyboards, electronic documents, video output from a camera connected to the user's touchpoint device, data entered by the user or customer representative, status information, error messages, and the like. Moreover, it will be understood that, although described as a first display area 520 and second display area 550, there may be any number of display areas within the customer service window 515 including a single display area with multiple features. Additionally, although the customer service window 515 is shown in the foreground of the graphical user interface 500, it is understood that the customer service window may be located at any position within the graphical user interface.

Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

The invention claimed is:

1. A computer implemented method for providing customer support comprising:

receiving, by a touchpoint device, identification information from a user of the touchpoint device;

receiving, by a server, the identification information;

providing an electronic document to the user;

receiving, by the server, information inputted by the user into the electronic document;

after receiving the information inputted by the user into the electronic document, receiving, by the server, an input from the user requesting a session with a representative;

selecting, by the server, a representative based at least in part on the electronic document;

providing the information inputted by the user into the electronic document to the representative; and establishing a connection between the representative and the touchpoint device.

2. The method according to claim 1, wherein the touchpoint device is a personal computer.

3. The method according to claim 1, wherein the touchpoint device is a mobile phone, automated teller machine, kiosk, personal digital assistant, or tablet computer.

4. The method according to claim 1, further comprising providing at least a portion of the identification information from the user to the representative.

5. The method according to claim 1, further comprising providing the electronic document to the representative.

6. The method according to claim 1, further comprising determining, by a server, a subject matter of the electronic document.

7. The method according to claim 6, further comprising routing a message to connect a particular representative based upon the determination of the subject matter of the electronic document.

8. The method according to claim 7, further comprising retrieving information from a database that associates the electronic document with a subject matter.

9. The method according to claim 1, further comprising:

upon receiving a request from the user for a session with a representative, automatically generating a request for a representative based on the electronic document;

transmitting the request to a call center; and routing the request to a representative with expertise in the electronic document.

10. The method according to claim 1, further comprising receiving a transmission of a video and audio of the user from the touchpoint device to the representative.

11. A system for providing customer support comprising:

a server of a financial institution adapted to provide an electronic document to a touchpoint device in operation by a user;

a first database communicatively coupled to the server and adapted to store the electronic document;

a second database communicatively coupled to the server and adapted to store account information of the user; and a workstation communicatively coupled to the server and configured to be operable by a customer service representative, the workstation comprising:

a camera for capturing video of the customer service representative;

a microphone for capturing audio of the customer service representative;

a display for presenting information about the electronic document provided to the user; and an input device configured for the customer service representative to input commands to access information about the user and inputted by the user into the electronic document;

wherein the user can access video and audio of the customer service representative on a display of the touchpoint device upon a request by the user, and wherein the server directs the request of the user for video and audio of the customer service representative to a particular customer service representative that has expertise relating to the electronic document having information inputted by the user.

12. The system according to claim 11, wherein the touchpoint device is a personal computer.

13. The system according to claim 11, wherein the touchpoint device is a mobile phone, automated teller machine, kiosk, personal digital assistant, or tablet computer.

14. The system according to claim 11, further comprising a call center for routing a request from the server to the workstation of the customer service representative.

15. A method for providing customer support comprising:

providing a user interface to a user to display on a touchpoint device;

providing a first area of the user interface to display an electronic document;

receiving information inputted by the user into the electronic document;

providing a second area of the user interface that has a link for requesting assistance from a customer service representative;

receiving a selection by the user of the link for assistance after inputting information into the electronic document;

routing a request for assistance to a particular customer service representative based on the electronic document displayed in the first area of the user interface;

providing to the customer service representative information inputted by the user into the electronic document;

establishing a video feed of the customer service representative from a computer of the customer service representative to the user's touchpoint device; and providing the video feed of the customer service representative in the first area along with the electronic document.

16. The method according to claim 15, wherein the touchpoint device is a personal computer.

17. The method according to claim 15, wherein the touchpoint device is a mobile phone, automated teller machine, kiosk, personal digital assistant, or tablet computer.

18. The method according to claim 15, further comprising providing the electronic document to the customer service representative.

19. The method according to claim 15, further comprising determining, by a server, a subject matter of the electronic document.

20. The method according to claim 19, further comprising routing a message to connect a particular representative based upon the determination of the subject matter of the electronic document.

21. The method according to claim 20, further comprising retrieving information from a database that associates the electronic document with a subject matter.

22. The method according to claim 15, further comprising receiving a transmission of a video and audio of the user from the touchpoint device to the representative.

* * * * *